(12) United States Patent
He

(10) Patent No.: US 9,558,674 B2
(45) Date of Patent: Jan. 31, 2017

(54) AIRCRAFT SYSTEMS AND METHODS TO DISPLAY ENHANCED RUNWAY LIGHTING

(71) Applicant: HONEYWELL INTERNATIONAL INC., Morristown, NJ (US)

(72) Inventor: Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/680,626

(22) Filed: Apr. 7, 2015

(65) Prior Publication Data

US 2016/0300497 A1    Oct. 13, 2016

(51) Int. Cl.
| | |
|---|---|
| B64F 1/20 | (2006.01) |
| G08G 5/00 | (2006.01) |
| G08G 5/02 | (2006.01) |
| G08B 21/00 | (2006.01) |

(52) U.S. Cl.
CPC ............ *G08G 5/025* (2013.01); *G08G 5/0026* (2013.01)

(58) Field of Classification Search
CPC ................................ G08G 5/025; G08G 5/0026
See application file for complete search history.

(56) References Cited

U.S. PATENT DOCUMENTS

| | | | | |
|---|---|---|---|---|
| 5,534,694 A | * | 7/1996 | Ball ........................ | G01J 1/26 250/330 |
| 7,432,828 B2 | | 10/2008 | He et al. | |
| 7,689,326 B2 | | 3/2010 | He | |
| 8,810,435 B2 | | 8/2014 | He | |
| 2009/0265088 A1 | | 10/2009 | Dias et al. | |
| 2012/0007979 A1 | * | 1/2012 | Schneider ................. | G01J 3/36 348/116 |
| 2012/0056759 A1 | * | 3/2012 | He ......................... | G01C 23/00 340/960 |
| 2013/0188049 A1 | * | 7/2013 | Koukol ................. | G06T 7/0044 348/144 |
| 2014/0249703 A1 | | 9/2014 | He | |

(Continued)

FOREIGN PATENT DOCUMENTS

| | | |
|---|---|---|
| EP | 0384993 A2 | 9/1990 |
| EP | 2234088 A2 | 9/2010 |

(Continued)

OTHER PUBLICATIONS

Dowell, S.R. et al.; The Effect of Visual Location on Cognitive Tunneling With Superimposed HUD Symbology; Paper to appear in the Proceedings of the 46th Annual Meeting of the Human Factors and Ergonomic Society. Santa Monica, CA: HFES (2002).

(Continued)

*Primary Examiner* — Erin File
(74) *Attorney, Agent, or Firm* — Lorenz & Kopf, LLP

(57) ABSTRACT

A display system for an aircraft includes a processing unit configured to determine runway lighting information for runway lighting associated with a selected runway and to generate display commands based on the runway lighting information. The runway lighting is located at a first location relative to the selected runway. The display system further includes a display device coupled the processing unit for receiving the display commands and operable to selectively render first symbology representing the runway lighting information at a second location relative to the selected runway.

20 Claims, 4 Drawing Sheets

(56) References Cited

U.S. PATENT DOCUMENTS

| | | | | |
|---|---|---|---|---|
| 2015/0002316 A1* | 1/2015 | Sridhar | ............ | B64D 43/00 340/953 |
| 2015/0232198 A1* | 8/2015 | Seibt | ............ | B64D 47/02 362/470 |

FOREIGN PATENT DOCUMENTS

| | | | |
|---|---|---|---|
| EP | 2416124 | A2 | 2/2012 |
| EP | 2560152 | A1 | 2/2013 |
| EP | 1818650 | B1 | 9/2013 |

OTHER PUBLICATIONS

Foyle, D.C. et al.; NASA Aviation Safety Program Conference on Human Performance Modeling of Approach and Landing with Augmented Displays; NASA/CP—2003-212267; Ames Research Center; Moffett Field, California; Sep. 2003.

Doehler, H.; Improving visual-conformal displays for helicopter guidance: German Aerospace Center (DLR e.V.) Braunschweig, Germany; SPIE Newsroom; 10.1117/2.1201310.005162; 2013.

Reynolds, et al.; Colour for Air Traffic Control Displays, Displays Devices, Dempa Publications, Tokyo, JP, vol. 15, No. 4, Jan. 1, 1994.

Extended EP Search Report for Application No. 16163064.5-1803/3079138 dated Oct. 21, 2016.

\* cited by examiner

AIRCRAFT SYSTEMS AND METHODS TO DISPLAY ENHANCED RUNWAY LIGHTING

TECHNICAL FIELD

The present invention generally relates to aircraft display systems and methods, and more particularly, to systems and methods for enhanced display of runway approach lighting during a landing operation.

BACKGROUND

Computer generated aircraft displays have become highly sophisticated and are used as primary flight displays to provide flight crews with real-time visual representations of flight management, navigation, and control information in a single, readily interpretable display. As a result, such displays have become effective visual tools for controlling aircraft, reducing pilot workload, increasing situational awareness, and improving overall flight safety.

Landing is typically the most demanding aspect of flight. During the landing approach, the pilot must evaluate if the aircraft may safely land or if the landing attempt should be aborted. The time allocated to this task is very limited given the airspeed of the aircraft and the typical or nominal reaction time of the pilot. The landing operation may be further complicated during low visibility or nighttime conditions. Although conventional display systems provide various types of information about the landing environment, such displays are typically not as helpful during landing situations, particularly in tasks such as anticipating and identifying airport lighting information.

Accordingly, it is desirable to provide systems and methods with additional and/or more convenient flight information on an aircraft visual display during a landing operation. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system for an aircraft includes a processing unit configured to determine runway lighting information for runway lighting associated with a selected runway and to generate display commands based on the runway lighting information. The runway lighting is located at a first location relative to the selected runway. The display system further includes a display device coupled the processing unit for receiving the display commands and operable to selectively render first symbology representing the runway lighting information at a second location relative to the selected runway.

In accordance with another exemplary embodiment, a method is provided for an aircraft display. The method includes identifying, with a processing unit, runway lighting associated with a selected runway, the runway lighting being located at a first location relative to the selected runway in a runway environment; and displaying, with a display device, the runway lighting in a second location relative to the selected runway in the runway environment.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft. More specifically, the display systems and methods provide additional and/or more convenient landing information superimposed with other navigation and control information when approaching a runway. In one exemplary embodiment, runway approach lighting may be presented in a shifted location or position to improve visibility.

Figure 1:
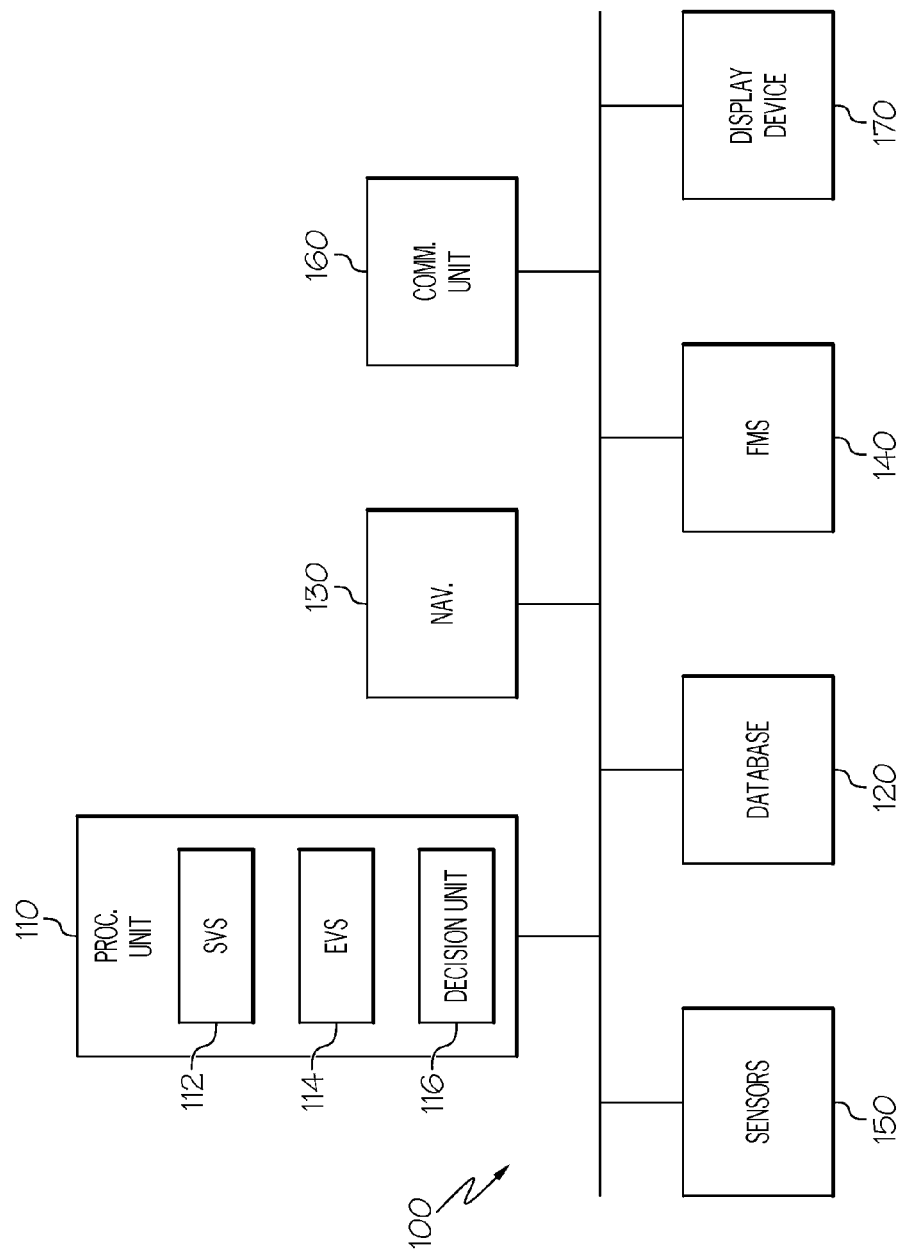
FIG. 1 is a functional block diagram of an aircraft display system in accordance with an exemplary embodiment.

FIG. 1 is a block diagram of an aircraft display system 100 in accordance with an exemplary embodiment. It should be understood that FIG. 1 is a simplified representation of the system 100 for purposes of explanation and ease of description. Further exemplary embodiments of the system 100 may include additional, or other devices and components for providing further functions and features. The system 100 can be utilized in an aircraft, such as a helicopter, airplane, or unmanned vehicle. Moreover, exemplary embodiments of the system 100 can also be utilized in spacecraft, ships, submarines, and other types of vehicles. For simplicity, exemplary implementations are described below with reference to "aircraft."

In one exemplary embodiment, the system 100 is particularly useful during a landing operation in which the aircraft is approaching a runway. During operation, the pilot may be required to visually identify certain features of a runway through the cockpit window before landing. Many airports, for example, have approach lighting, at least portions of which form an approach lighting signature immediately in front of each runway. As examples, the approach lighting signature may be a series of lights forming a "T" or a cross pattern to assist pilots in locating the runway. As such, when a pilot is landing an aircraft, the pilot may be required to identify, visually through the cockpit window, the approach lighting signature or another specific feature before the aircraft may descend below a certain altitude relative to the runway. In some exemplary embodiments, the nature of the approach lighting and the tasks at particular positions may be determined by government or other type of flight regulations. In addition to required identification, the approach lighting signature may also be used to verify lateral alignment.

As noted above, the system 100 may be used to display runway lighting, particularly the approach lighting signature. In general, "runway lighting" or "runway approach lighting" may refer to any type of lighting associated with, for example, an approach lighting system (ALS), threshold lighting, touchdown lighting, and the like. Additional details about the display are provided below after a brief introduction of the components of the system 100.

As shown in FIG. 1, the system 100 includes a processing unit 110, a database 120, a navigation system 130, a flight management system 140, sensors 150, a communications unit 160, and a display device 170 coupled together in any suitable manner, such with as a data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft The processing unit 110 may be a computer processor associated with a primary flight display or other aircraft display. In one exemplary embodiment, the processing unit 110 functions to at least receive and/or retrieve aircraft flight management information (e.g., from the flight management system 140), navigation and control information (e.g., from the navigation system 130), and landing, target and/or terrain information (e.g., from the database 120, sensors 150, and/or communications unit 160). As introduced above and discussed in further detail below, the processing unit 110 additionally calculates and generates display commands representing the flight environment, particularly the landing environment. The processing unit 110 may function as a graphics display generator to generate display commands based on algorithms or other machine instructions stored in the processing unit 110 or in separate memory components. The processing unit 110 then sends the generated display commands to display device 170 for presentation to the user.

In some embodiments, the processing unit 110 of the system 100 may include or be integrated with a synthetic vision system (SVS) 112, an enhanced vision system (EVS) (or enhanced flight vision system (EFVS)) 114, or a combined vision system. In the embodiment shown in FIG. 1, the processing unit 110 includes an SVS 112, an EVS 114, and a decision unit 116. Generally, the SVS 112 is configured to receive flight management and position information (e.g., from the navigation system 130 and flight management system 140) and terrain information (typically from database 120) to generate a three-dimensional image that shows the topographical environment through which the aircraft is flying from the perspective of a person sitting in the cockpit of the aircraft. Generally, the EVS 114 receives flight management and position information (e.g., from the navigation system 130 and flight management system 140) and terrain information (typically from sensors 150) to form an image that is then displayed to the pilot. In the embodiment of FIG. 1, the system 100 displays images from the SVS 112 and the EVS 114 on the same display screen (e.g., display device 170). In particular, the decision unit 116 is configured to correlate or register the images from the SVS 112 and EVS 114, determine how to combine the images, and facilitate display of the resulting image. In one exemplary embodiment, the decision unit 116 functions to overlay an image from the EVS 114 on top of the image from the SVS 112 with additional flight management and control symbology. In some exemplary embodiments, the SVS 112 and/or EVS 114 may be omitted. Additional details about the processing unit 110, including the SVS 112, EVS 114, and decision unit 116, will also be discussed below.

Depending on the embodiment, the processing unit 110 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 110 includes processing logic that may be configured to carry out the functions, techniques, and processing tasks or methods associated with operation of the system 100.

Although not shown, the processing unit 110 may include a user interface coupled to the processing unit 110 to allow a user to interact with the display device 170 and/or other elements of the system 100. The user interface may be realized as a keypad, touchpad, keyboard, mouse, touch panel, joystick, knob, line select key or another suitable device adapted to receive input from a user. In some embodiments, the user interface may be incorporated into the display device 170, such as a touchscreen. In further embodiments, the user interface is realized as audio input and output devices, such as a speaker, microphone, audio transducer, audio sensor, or the like.

Database 120 is coupled to processing unit 110 and can be a memory device (e.g., non-volatile memory, disk, drive, tape, optical storage device, mass storage device, etc.) that stores digital landing, waypoint, target location, and terrain data as either absolute coordinate data or as a function of aircraft position that enables the construction of a synthetic or enhanced representation of the aircraft operating environment. Database 120 can additionally include other types of navigation and/or operational information relating to the evaluation and display of runway lighting information.

Runway and/or taxiway data in database 120 may be obtained from airports, Runway Awareness and Advisory System (RAAS), and airport mapping database (AMDB). The runway data may include, for example, the length, altitude and gradient of the intended landing runway. The runway data may also include a map of the airport, which includes data defining the runways at the airport, including the runway identifications, runway markings, and other references. In particular, as introduced above, the data in the database 120 may include information about the airport lighting for each runway, including lighting name and type, availability, status, and visual characteristics. Data in the database 120 may be uploaded prior to flight or received from external sources, such as an airport transmitter or onboard sensors. The runway data can be used to compare aircraft position with various aspects of the runway environment to subsequently generate a synthetic view of the runway environment relative to the aircraft, as discussed below.

The navigation system 130 is configured to provide the processing unit 110 with real-time navigational data and/or information regarding operation of the aircraft. The navigation system 130 may include or cooperate with a global positioning system (GPS), inertial reference system (IRS), Air-data Heading Reference System (AHRS), or a radio-based navigation system (e.g., VHF omni-directional radio range (VOR) or long range aid to navigation (LORAN)). The navigation system 130 is capable of obtaining and/or determining the current state of the aircraft, including the location (e.g., latitude and longitude), altitude or above ground level, airspeed, pitch, glide scope, heading, and other relevant flight information.

The flight management system 140 supports navigation, flight planning, and other aircraft control functions, as well as provides real-time data and/or information regarding the operational status of the aircraft. The flight management system 140 may include or otherwise access one or more of the following: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag, and/or other suitable avionics systems. As examples, the flight management system 140 may identify operating states of the aircraft, such as engine operation and current aircraft configuration status, including information regarding the current flap configuration, aircraft speed, aircraft pitch, aircraft yaw, aircraft roll, and the like. Additionally, the flight management system 140 may identify or otherwise determine environmental conditions at or near the current location of the aircraft, such as, for example, the current temperature, wind speed, wind direction, atmospheric pressure, and turbulence. The flight management system 140 may also identify optimized speeds, distance remaining, time remaining, cross track deviation, navigational performance parameters, and other travel parameters.

The system 100 may include or otherwise receive information from one or more sensors 150. In one exemplary embodiment, the sensors 150 may include sensors configured to detect a light signature originating from outside the aircraft, such as a visible low light television camera, an infrared camera, and millimeter wave (MMW) camera or any other light sensing device capable of detecting light either within or outside of the visible spectrum. Other sensors 150 may include, as examples, radar, lidar, sonar, and/or weather sensors that may provide information the system 100. In some embodiments, the sensors 150 may be incorporated into the navigation system 130 and/or flight management system 140. As described below, the sensors 150 may particularly function to collect information about the position, nature, and arrangement of approach lighting relative to current aircraft position, e.g., for the EVS 114 of the processing unit 110.

The communications unit 160 may be any suitable device for sending and receiving information to and from the system 100. In some embodiments, communications unit 160 may be configured to receive radio frequency transmissions, satellite communication transmissions, optical transmissions, laser light transmissions, sonic transmissions or transmissions of any other wireless form of data link. In one exemplary embodiment, the communications unit 160 is configured to send and/or receive information from the airport and/or runway on which the aircraft is preparing to land. As described below, the communications unit 160 provides this information to the processing unit 110 for consideration as part of the visual display presented to the operator during the landing operation.

The system 100 also includes the display device 170 coupled to the processing unit 110. The display device 170 may include any device or apparatus suitable for displaying various types of computer generated symbols and flight information discussed above. Using data retrieved (or received) from the navigation system 130, flight management system 140, database 120, sensors 150, and/or communications unit 160, the processing unit 110 executes one or more algorithms (e.g., implemented in software) for determining the position of the various types of desired information on the display device 170. As noted above, the processing unit 110 then generates display commands representing this data, and sends display commands to the display device 170.

In various exemplary embodiments, the rendered image may be a two-dimensional lateral view, a two-dimensional vertical profile view, or a three-dimensional perspective view. Any suitable type of display medium capable of visually presenting multi-colored or monochrome flight information for a pilot or other flight crew member can be provided, such as, for example, various types of CRT displays, LCDs, OLED displays, plasma displays, projection displays, HDDs, HUDs, and the like.

Accordingly, the system 100 functions to present an image or display to the user on the display device 170 that represents the environment surrounding the aircraft as well as various types of navigation and control information. As described below, the system 100 is particularly suitable for providing information to the user during a landing operation, including information associated with the runway. During operation, the runway on which the user intends to land may be selected by the user (e.g., via the user interface) or derived from a flight plan (e.g., via the navigation system 130 or flight management system 140). The processing unit 110 is configured (i.e., processing unit 110 is loaded with, and operates, appropriate software, algorithms and/or subroutines) to receive information associated with target runway from database 120 and sensors 150, including runway lighting data related to the target runway. In particular, the processing unit 110 generates display commands for the display device 170 to render landing symbology that represents the real-life appearance of the landing environment. In one exemplary embodiment, the landing environment may be a synthetic image generated by the SVS 112 with enhanced portions generated by the EVS 114. As an example, the EVS 114 may provide symbology in the form of an image of the runway approach lighting that may overlay or replace a corresponding portion of the image generated by the SVS 114. The processing unit 110 further provides various types of navigation and control information displayed with or superimposed on the landing environment, some of which is discussed below.

In most situations, the system 100 graphically displays the runway lighting information on the display device 170 to provide an accurate depiction of the runway lighting with respect to location and appearance. However, in one exemplary embodiment, the processing unit 110 is configured to evaluate the runway lighting based on the current position and flight scenario, and at a predetermined position (e.g., altitude or location), the processing unit 110 is configured to identify the approach lighting and render display commands to shift the location of the runway lighting to prevent or mitigate any blocking of the approach lighting by primary flight symbology. As the aircraft moves closer to the runway, the approach lighting is shifted back into the original location. Additional details regarding the display of the approach lighting is provided below.

Figure 2:
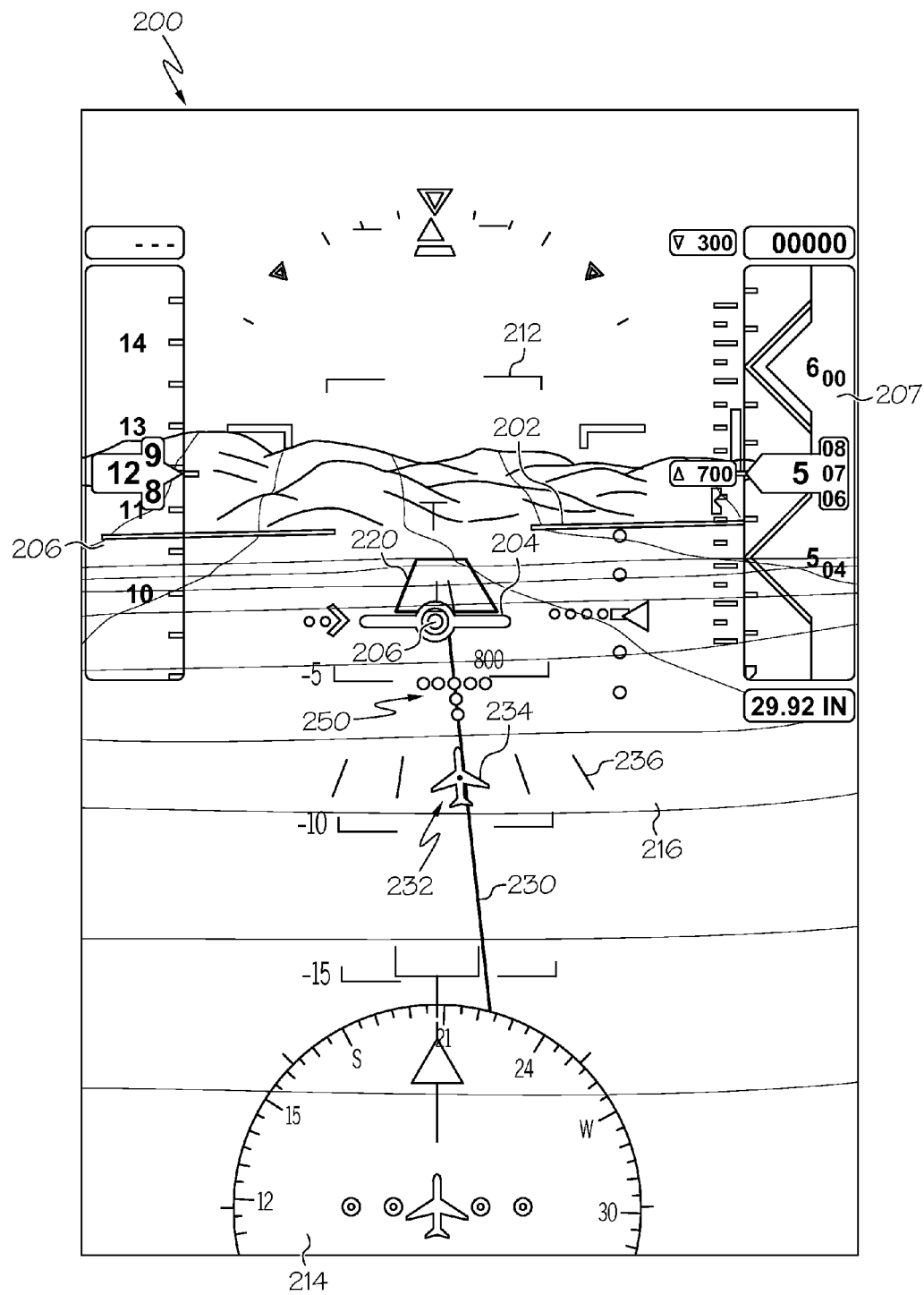
FIG. 2 is a visual display rendered by the aircraft display system of FIG. 1 in a first scenario in accordance with an exemplary embodiment.

FIG. 2 depicts an exemplary visual display 200 rendered on an aircraft display device. In one exemplary embodiment, the visual display 200 may be rendered by the system 100 of FIG. 1 on the display device 170. As such, FIGS. 1 and 2 are referenced in the discussion below.

As shown, FIG. 2 depicts an exemplary visual display 200 in the form of a three-dimensional perspective view of the real-time aircraft operating environment of the type presented on a primary flight display. As described above, the position and appearance of the images and other symbology on the visual display 200 may be dynamically generated by the processing unit 110 based on input from the database 120, navigation system 130, flight management system 140, sensors 150, and/or communications unit 160. In the example of FIG. 2, the display 200 is primarily a synthetic image generated by the SVS 112 with a sensor (or video) image generated by the EVS 114 selectively displayed in front of and covering a synthetic portion of the environment as an insert. As noted above, the sensor image is appropriately registered with the synthetic image by the decision unit 116. In the depicted exemplary embodiment, the sensor image corresponds to approach lighting 250, as will be discussed in greater detail below.

In the depicted exemplary embodiment, the display 200 shows, among other things, computer generated symbols representing a zero pitch reference line (e.g., commonly referred to as a horizon line) 202, a flight path marker 204, flight path referenced flight director 206, altitude indicator 207, airspeed indicator 208, horizontal situation indicator 210, pitch indicator 212, compass 214, and terrain (e.g., identified generally as element 216). Generally, the terrain 216 can include any representation of the environment surrounding the aircraft, including man-made and natural features. Additional information may be provided on the display 200, including additional or alternative indicators representing operation, navigation, and control characteristics of the aircraft. Although the display 200 is shown as an egocentric, first-person frame of reference, the display 200 may present other perspectives or views.

The visual display 200 further includes symbology representing the target runway 220, approach course 230, and lateral deviation 232. As shown, the target runway 220 may be emphasized with a colored or highlighted outline. The approach course 230 represents a line extending from the center of the runway 220 towards the aircraft, and the lateral deviation 232 represents the current position of the aircraft relative to the intended approach course 230. As shown in FIG. 2, the lateral deviation 232 includes an aircraft symbol 234 positioned relative to deviation marks 236 to indicate the current position (e.g., typically from the navigation system 130) relative to the approach course 230 (e.g., left or right) and the magnitude of any deviation. As described in greater detail below, additional images or symbology such as the approach lighting 250 may be used to validate or mitigate any errors associated with the lateral deviation 232.

As depicted in FIG. 2, the flight path marker 204 is a primary guidance symbol, typically in the form of a circle with horizontal lines (representing wings) extending on both sides to indicate where the aircraft is "aimed." In the view of FIG. 2, the flight path marker 204 informs the operator that the aircraft is flying to the target runway location. The flight director 206 is a further primary guidance symbol and is used to provide guidance information (e.g., from the flight management system 140 and/or navigation system 130). If the flight director 206 is centered within flight path marker 204, the flight guidance information is satisfied, while if the flight director 206 moved out of flight path marker 204, the aircraft may be commanded to roll in the direction of the flight director 206 (e.g., by the operator and/or autopilot) until the flight director 206 returns to the center of the flight path marker 204, as an example. Generally, the flight path marker 204 and flight director 206, individually or collectively, may be referred to as "primary flight symbology."

As would be expected in normal operation, during a landing approach to a target runway, the flight path marker 204 and flight director 206 are positioned at the front edge of the runway 220. For clarity, in the discussion of exemplary embodiments, the area immediately in front of the runway 220 may be referred to as a "first area" or "first location."

As noted above, the runway lighting generally includes various types of lights, including approach lighting that may form a runway lighting signature positioned immediately in front of the runway in the first location. At some distance from runway, the perspective image of runway and the associated approach lighting signature may be small. Considering that the runway lighting signature is physically located in the first location at the threshold of the runway 220, the flight path marker 204 and/or flight director 206 are often positioned over the area corresponding to the runway lighting signature. In conventional systems, the flight path marker 204 and flight director 206 would otherwise obscure the runway lighting signature. Since flight director 206 and flight path marker 204 are the primary flight guidance symbology reflecting the current flying state of the aircraft, flight director 206 and flight path marker 204 are not generally deemphasized for a more clear view of other display elements, including the approach lighting.

As will now be described in more detail, in certain scenarios, the display 200 also selectively renders the approach lighting 250 in a position that prevents and/or mitigates interference between the flight path marker 204 and/or flight director 206 (or other form of primary flight symbology) and the approach lighting 250. In the depicted embodiment, the approach lighting 250 represents an approach lighting signature for the target runway 220.

Generally, in one exemplary embodiment, and as discussed in greater detail below, the approach lighting 250 is depicted in the visual display 200 as the airport lighting would appear to a viewer, e.g., the visual display 200 accurately depicts the orientation, arrangement, number, and color of lights associated with the target runway 220. The approach lighting 250 may include the visual characteristics of the lighting, as well as a textual indication of the type or name of the lighting. Additionally, the approach lighting 250 may accurately depict the dynamic lighting behavior of the corresponding lighting, such as flashing and sequencing. Moreover, the visual display 200 accurately depicts the color, number, and arrangement of the approach lighting 250. As noted above, other types of approach lighting 250 may be displayed, depending on the lighting associated with the target runway 220. Additional information regarding the nature of the approach lighting 250 during most conditions is discussed below.

In the situation depicted by FIG. 2, the aircraft has reached a predetermined position, for example, at an above-ground level (AGL) altitude. When the aircraft reaches this position, the system 100 identifies the approach lighting 250 for the runway 220 and shifts the display location of the approach lighting 250 from the first location (e.g., in the actual location of the lighting at the edge of the runway) to a second location. The system 100 may shift the area containing the approach lighting or merely the symbology representing the approach lighting 250. Either way, the system 100 shifts the approach lighting 250 to the second location such that the approach lighting 250 is in a more forward position, e.g., separated from and further in front of the runway 220. Generally, this second position is along the approach course 230 such that the approach lighting 250 maintains the proper lateral position relative to the aircraft approach course 230 and runway 220.

In the shifted position, the approach lighting 250 is more readily visible and identifiable to the user. In particular, the approach lighting 250 is less likely to be obscured relative to the flight path marker 204, flight director 206, and/or any other primary flight symbology that may be present in the first location. Since the approach lighting 250 is more visible in this second position, the user is able to use the approach lighting 250 to confirm lateral alignment with respect to the runway 220. Additionally, the approach lighting 250 provides the user with the expected appearance such that the actual approach lighting may be more readily identified during the evaluation of the landing operation.

The system 100 may select or determine the shifted location in any suitable manner. In one exemplary embodiment, the system 100 may render the approach lighting 250 such that the approach lighting 250 appears just forward of the primary flight symbology 204, 206 to prevent interference (e.g., by evaluating the position of the primary flight symbology 204, 206 on the display 200 relative to the first and second locations) while displaying the approach lighting 250 in the location closest to the actual location while being unobstructed.

As another example, the portion of image where approach lighting may appear is determined by finding a block of pixel corresponding to a position of about 1000 feet (or other predetermined or selected distance) away from the forward threshold of the runway 230. That portion of the image pixel is pushed forward or downward in the image by a localized small image distortion. As such, since the primary flight symbology 204, 206 is likely positioned at a location on the display 200 within 1000 feet in front of the runway, shifting this area relative to the other symbology (including the primary flight symbology 204, 206) results in the approach lighting 250 appearing below the primary flight symbology 204, 206. As noted above, the block of pixels corresponding to the approach lighting 250 may be generated by the EVS 114 and selected and inserted or overlaid by the decision unit 116 to result in the display 200 of FIG. 2. In such embodiments, the approach lighting 250 may represent real-time video images of the approach lighting. In other embodiments, the block of pixels corresponding to the approach lighting 250 may be generated by the SVS 112, e.g., from information in the database 120.

In one exemplary embodiment, the shifted position of the approach lighting 250 may be a function of aircraft position. For example, in one exemplary embodiment, the shifted position of the approach lighting 250 is modified as the aircraft approaches the runway 220. In particular, the approach lighting 250 moves closer to the first location (e.g., closer to the actual location of the approach lighting). As described in greater detail below, when the aircraft reaches a further predetermined position (e.g., location and/or altitude), the approach lighting 250 is again represented in the first location such that the approach lighting 250 is rendered in a manner that accurately reflects the position of the approach lighting 250 at edge of the runway 220. As such, in one exemplary embodiment, the location of the rendered approach lighting 250 approaches this first position gradually, while in other embodiments, the location of the rendered approached lighting 250 is immediately shifted from the initial second position to the first position.

Figure 3:
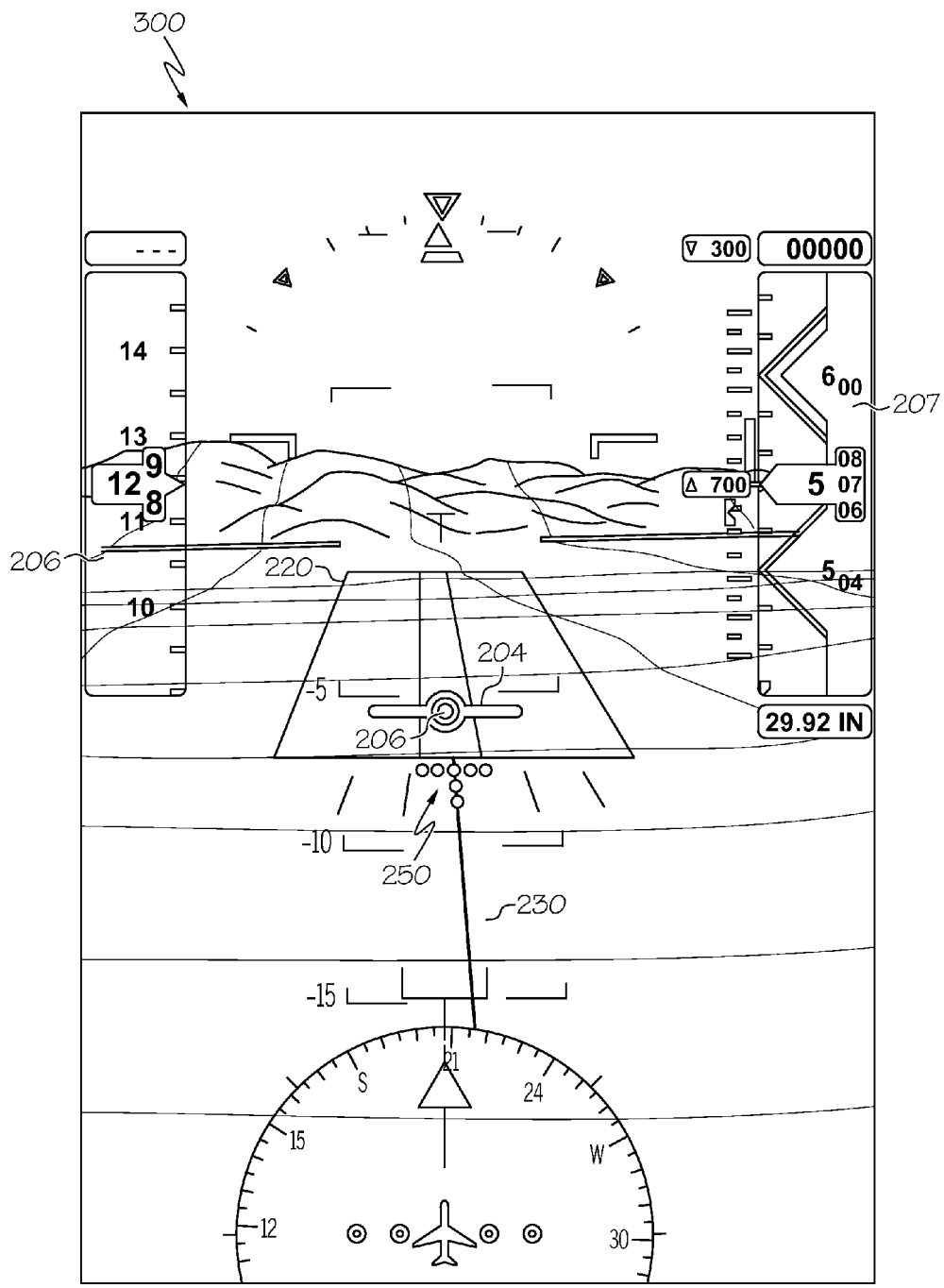
FIG. 3 is a visual display rendered by the aircraft display system of FIG. 1 in a second scenario in accordance with an exemplary embodiment.

Reference is briefly made to FIG. 3, which is a visual display 300 that corresponds to the visual display 200 of FIG. 2, albeit in a second scenario in which the aircraft is closer to the runway 220. Generally, the visual display 300 of FIG. 3 has symbology similar to that of FIG. 2, including the flight path marker 204, flight director 206, runway 220, approach course 230, and approach lighting 250. As shown in FIG. 3, at the further predetermined position, the approach lighting 250 is displayed in the initial, first position to reflect the real-world position of the approach lighting 250 arranged on the front edge of the runway 220.

Returning to FIG. 2, in one exemplary embodiment, the size of the approach lighting 250 may be exaggerated in scale relative to other aspects of the visual display 200 to facilitate evaluation, while in other embodiments, the system 100 may maintain the size of the approach lighting 250 in the second position as it would otherwise appear in the first position. In some embodiments, the size of symbology representing the approach lighting 250 may be a function of the distance of the runway 220 from the aircraft such that the size of the initially exaggerated approach lighting 250 is reduced as the aircraft travels along the approach course 230 until the size reaches a 1:1 scale with the surrounding environment, such as that shown in FIG. 3.

In some embodiments, the visual display 200 may depict approach lighting 250 that is positioned in the shifted location with symbology and/or characteristics that represent the shifted nature. For example, the approach lighting 250 may be presented in a different color that would otherwise be represented or the approach lighting 250 may be outlined or highlighted to indicate that the approach lighting 250 has been shifted. Other alerts may be provided, including other types of visual alerts and/or audio alerts. Although approach lighting 250 is described in the examples above, other aspects of runway lighting may be modified in the same manner to shift symbology into more readily viewable locations.

Figure 4:
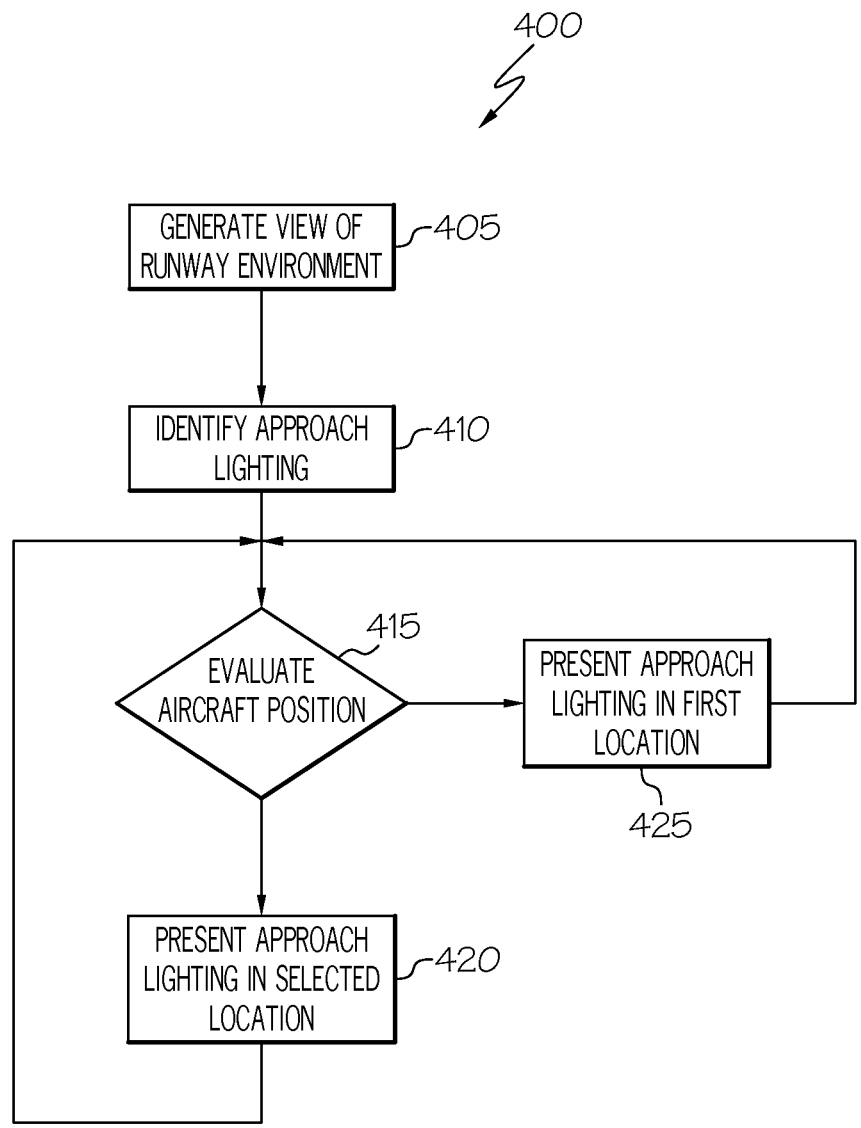
FIG. 4 is a flowchart of a method for displaying the runway landing environment in accordance with an exemplary embodiment.

Additional aspects regarding the operation of the system 100 and the visual display 200 are discussed below in the description of the method of FIG. 4. FIG. 4 is flowchart of a method 400 for displaying the runway landing environment in accordance with an exemplary embodiment. The method 400 of FIG. 4 may be used to render the visual display 200 with the system 100, and as such, FIGS. 1-3 are additionally referenced below in the discussion of FIG. 4. It should be appreciated that method 400 may include any number of additional or alternative tasks, and the tasks shown in FIG. 4 need not be performed in the illustrated order.

In a first step 405 of the method, the system 100 is configured to render a synthetic or enhanced view of the aircraft environment, including the runway landing environment as an aircraft approaches a selected runway. In a second step 410, the system 100 identities the area at which the approach lighting signature or other suitable runway approach lighting is expected to appear, as identified with the runway data, present aircraft position and orientation data, and approach course data. Generally, this area is immediately in front of the runway in a first location.

In a third step 415, the system 100 evaluates the position (e.g., distance or altitude) of the aircraft relative to the runway. At a first predetermined position, the method 400 proceeds to step 420 in which the approach lighting is shifted in location. In one exemplary embodiment, the first predetermined position is an above-ground level (AGL) altitude such as less than 600 feet or 800 feet. At a second predetermined position, the method 400 proceeds to step 425 in which the approach lighting is rendered in the original, first location. In one exemplary embodiment, the second predetermined position is an AGL altitude such as less than 400 feet. After steps 420 and 425, the method 400 returns to step 415 in which the system 100 continues to evaluate the aircraft position to selectively determine the appropriate location for rendering the approach lighting.

The exemplary embodiments discussed above render information related to various types of airport or runway lighting systems, particularly runway approach lighting. Various types of approach lighting systems (MLSAR, CAT I, CAT II, CAT III) may be considered, particularly those that the operator must acquire either visually or via electronic means in order to continue an approach under low visibility conditions.

Although approach lighting is discussed in the examples above, other types of runway lighting may be modified in other embodiments, including those associated with Precision Approach Path Indicator (PAPI) systems, Visual Approach Slope Indicator (VASI) systems, and lighting on the runway itself, such as threshold lighting, centerline lighting, runway edge lighting, touch down zone lighting, and Runway End Identifier Lighting (REILs). Therefore, the exemplary embodiments discussed above provide approach lighting and/or lighting signatures on a display in the context of current navigation conditions may serve as a highly relevant initial step for allowing low visibility approach operations. Further, within this context as flight crews depend on the current navigational information as well as the approach lighting information on the display for continuing the approaches, proper displays of this information are beneficial to landing tasks in general.

As noted above, the system 100 may provide enhance terrain imagery in existing multi-functional aircraft displays is to combine high resolution, computer-generated terrain image data derived from onboard databases (e.g., with SVS 112) with enhanced, real-time terrain image data derived from onboard vision sensor systems (e.g., with EVS 114). Such displays produce steady, three-dimensional perspective view images of the terrain for critical flight applications.

Accordingly, the enhanced display of the landing information can provide important information in a more convenient and/or salient position for easy recognition and evaluation. As such, during an approach and/or landing operation, the pilot can concentrate on the landing information without detracting attention from the navigation and control. This can reduce pilot workload and navigation and control errors, improve performance consistency, and increase flight safety. Based on this information, the pilot knows the appearance, type, and lateral position of the approach lighting. Additionally, the display of approach lighting enables the consideration without clutter or interference from primary flight symbology, which is particularly important during low visibility conditions. This enables the pilot to perform the referencing task during a landing operation more quickly and accurately.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
    a processing unit configured to determine runway lighting information for runway lighting associated with a selected runway and to generate display commands based on the runway lighting information, the runway lighting being located at a first location relative to the selected runway, the processing unit further configured to receive a current position of the aircraft relative to the selected runway and to generate the display commands based on the current position; and
    a display device coupled the processing unit for receiving the display commands and operable to
        selectively render first symbology representing the runway lighting information at a second location relative to the selected runway when the current position is a first predetermined position, and
        selectively render the first symbology representing the runway lighting information at the first location relative to the selected runway when the current position is a second predetermined position.

2. The display system of claim 1, wherein the runway lighting information is approach lighting.

3. The display system of claim 1, wherein the runway lighting information is an approach lighting signature.

4. The display system of claim 1, wherein the second location is closer to the aircraft than the first location.

5. The display system of claim 1, wherein the display device is further configured to display second symbology representing the selected runway, the first location being immediately adjacent and in front of the selected runway and the second location being separated from and in front of the selected runway.

6. The display system of claim 1, wherein the processing unit is further considered to determine a current altitude of the aircraft as the current position, and wherein the display device is configured to display the first symbology in the second location when the current altitude is between a first predetermined altitude and a second predetermined altitude as the first predetermined position and in the first location when the current altitude is less than the second predetermined altitude as the second predetermined position.

7. The display system of claim 6, wherein the display device is configured to highlight the runway lighting information when displaying the first symbology in the second location relative to the first location.

8. The display system of claim 1, wherein the processing unit is further configured to generate the display commands to include a flight path marker, and wherein the display device is configured to render the first symbology in the second location when the flight path marker is positioned in the first location.

9. The display system of claim 8, wherein the display device is configured to render the first symbology in the first location when the flight path marker has a position other than the first location.

10. A display system for an aircraft, comprising:
    a processing unit configured to determine runway lighting information for runway lighting associated with a selected runway and to generate display commands based on the runway lighting information, the runway lighting being located at a first location relative to the selected runway; and
    a display device coupled the processing unit for receiving the display commands and operable to selectively render first symbology representing the runway lighting information at a second location relative to the selected runway,
    wherein the processing unit is configured to generate the display commands that represent a three-dimensional synthetic view of a flight environment and an image of the runway lighting, and wherein the display device is configured to render the first symbology as the image of the runway lighting overlaying the three-dimensional synthetic view of the flight environment.

11. The display system of claim 10, further comprising
a database coupled to the processing unit and configured to provide information associated with the three-dimensional synthetic view of the flight environment; and
sensors coupled to the processing unit and configured to collect information for the image of the runway lighting.

12. The display system of claim 11, wherein the processing unit includes
a synthetic vision system configured to generate the display signals for the three-dimensional synthetic view of the flight environment;
an enhanced vision system configured to generate the image of the runway lighting; and
a decision unit configured to position the overlay of the image of the runway lighting on the three-dimensional synthetic view of the flight environment.

13. The display system of claim 1, wherein the display device is a primary flight display.

14. A method for an aircraft display, comprising:
determining a current position of the aircraft;
identifying, with a processing unit, runway lighting associated with a selected runway, the runway lighting being located at a first location relative to the selected runway in a runway environment;
displaying, with a display device, the runway lighting in a second location relative to the selected runway in the runway environment when the current position of the aircraft is a first predetermined position; and
displaying, with a display device, the runway lighting in the first location relative to the selected runway in the runway environment when the current position of the aircraft is a second predetermined position.

15. The method of claim 14, wherein the identifying step includes identifying an approach lighting signature as the runway lighting.

16. The method of claim 14, wherein the displaying step includes displaying the selected runway, the first location being immediately adjacent and in front of the selected runway and the second location being separated from and in front of the selected runway.

17. The method of claim 14, wherein the displaying step further includes displaying primary flight symbology relative to the selected runway in the runway environment in the first location.

18. The method of claim 14, further comprising determining a current altitude of the aircraft as the current position, and wherein the displaying step includes displaying the runway lighting in the second location when the current altitude is between a first predetermined altitude and a second predetermined altitude as the first predetermined position and in the first location when the current altitude is less than the second predetermined altitude as the second predetermined position.

19. The method of claim 14, further comprising displaying a three-dimensional synthetic view of the runway environment, and wherein the displaying the runway lighting includes overlaying an image of the runway lighting on the three-dimensional synthetic view of the flight environment.

20. The method of claim 19, further comprising receiving the image of the runway lighting from an enhanced vision system (EVS).

* * * * *